(12) United States Patent
Drepper

(10) Patent No.: US 7,937,692 B2
(45) Date of Patent: May 3, 2011

(54) METHODS AND SYSTEMS FOR COMPLETE STATIC ANALYSIS OF SOFTWARE FOR BUILDING A SYSTEM

(75) Inventor: Ulrich Drepper, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 1368 days.

(21) Appl. No.: 11/289,404

(22) Filed: Nov. 30, 2005

(65) Prior Publication Data

US 2007/0169027 A1 Jul. 19, 2007

(51) Int. Cl.
*G06F 9/45* (2006.01)

(52) U.S. Cl. ........ 717/140; 717/106; 717/124; 717/126; 717/131; 717/141; 717/154; 717/162; 717/172

(58) Field of Classification Search .................. 717/140, 717/154, 141, 174, 166, 149, 120, 121, 122
See application file for complete search history.

(56) References Cited

U.S. PATENT DOCUMENTS

| | | | | |
|---|---|---|---|---|
| 5,423,042 A * | 6/1995 | Jalili et al. | ..................... | 719/328 |
| 5,469,572 A * | 11/1995 | Taylor | ........................... | 717/152 |
| 5,694,540 A * | 12/1997 | Humelsine et al. | ............. | 714/38 |
| 5,734,908 A * | 3/1998 | Chan et al. | .................... | 717/154 |
| 6,292,940 B1 * | 9/2001 | Sato | ............... | 717/157 |
| 6,308,320 B1 * | 10/2001 | Burch | ........................... | 717/154 |
| 6,453,465 B1 * | 9/2002 | Klein | ............................. | 717/141 |
| 6,598,058 B2 * | 7/2003 | Bird et al. | ..................... | 707/201 |
| 6,643,842 B2 * | 11/2003 | Angel et al. | .................. | 717/130 |
| 6,665,688 B1 * | 12/2003 | Callahan et al. | ............. | 707/200 |
| 6,769,115 B1 * | 7/2004 | Oldman | ......................... | 717/126 |
| 6,817,014 B2 * | 11/2004 | Hundt et al. | ................... | 717/159 |
| 6,874,141 B1 * | 3/2005 | Swamy et al. | ................ | 717/144 |
| 7,065,760 B2 * | 6/2006 | Dmitriev | ........................... | 718/1 |
| 7,165,242 B2 * | 1/2007 | Dmitriev | ........................ | 717/130 |
| 7,178,140 B2 * | 2/2007 | Dmitriev | ....................... | 717/166 |
| 7,219,338 B2 * | 5/2007 | Venter | ........................... | 717/140 |
| 7,398,516 B2 * | 7/2008 | Berg et al. | ...................... | 717/126 |
| 7,398,517 B2 * | 7/2008 | Berg et al. | ...................... | 717/126 |
| 7,409,681 B2 * | 8/2008 | Graham et al. | ................ | 717/146 |
| 7,418,734 B2 * | 8/2008 | Berg et al. | ........................ | 726/25 |
| 7,484,204 B2 * | 1/2009 | Zatloukal | ....................... | 717/141 |
| 7,484,205 B2 * | 1/2009 | Venkatapathy | ................ | 717/158 |
| 7,487,496 B2 * | 2/2009 | O'Brien et al. | ................ | 717/149 |
| 7,661,097 B2 * | 2/2010 | Mukkavilli | .................... | 717/143 |
| 2002/0170041 A1 * | 11/2002 | Shann | ............................ | 717/141 |
| 2004/0143814 A1 * | 7/2004 | de Jong | ........................... | 717/104 |
| 2004/0194072 A1 * | 9/2004 | Venter | ............................ | 717/140 |
| 2005/0097527 A1 * | 5/2005 | Chakrabarti et al. | .......... | 717/140 |
| 2006/0123382 A1 * | 6/2006 | O'Brien et al. | ................ | 717/100 |
| 2007/0169027 A1 * | 7/2007 | Drepper | ........................ | 717/140 |

* cited by examiner

*Primary Examiner* — Michael J Yigdall
*Assistant Examiner* — Ziaul A. Chowdhury
(74) *Attorney, Agent, or Firm* — MH2 Technology Law Group LLP

(57) ABSTRACT

Embodiments of the present invention provide systems and methods for the static analysis of entire systems of software. Source code for at least some of the software system is received. An functional representation of the source code is generated from when the source code is compiled and references to other software are identified. The functional representations of the other software is retrieved from an archive and an abstract representation of the entire software system is built. A static analysis is then performed against the abstract representation of the entire system and results are provided. The software system or one or more of its components may be certified based on the static analysis results.

15 Claims, 3 Drawing Sheets

METHODS AND SYSTEMS FOR COMPLETE STATIC ANALYSIS OF SOFTWARE FOR BUILDING A SYSTEM

DESCRIPTION OF THE INVENTION

1. Field of the Invention

The present invention relates generally to software testing and, more particularly, to the static analysis of software.

2. Background of the Invention

Today, most enterprises and organizations rely on more and more complex software to support their operations and maintain important data. Therefore, ensuring the reliability of software has become more important than ever.

The traditional method of ensuring the reliability of software is to perform testing to identify bugs, security issues, and the like by running the generated code using provided input data and check that the expected output is produced. Static analysis has become a popular method of testing software. Static analysis is the reading and analysis of software source code.

Static analysis has several advantageous features, which makes it a popular form of testing. First, static analysis does not require any execution of the software. Thus, static analysis does not require elaborate test scripts and the generation of appropriate input data or equipment to perform its testing. In addition, static analysis allows for the analysis of all code paths. In contrast, operational testing typically tests only a few scenarios, which allows latent bugs or security issues to go undetected. Static analysis tools perform well on closed sets of source code that do not rely on external references to other software. For example, many static analysis tools have been applied to operating system kernels.

However, external referencing is a common feature of most software. For example, beyond the kernel, much of an operating system relies on references to external software, such as dynamically shared objects, libraries, and the like provided by the operating system or third parties. Unfortunately, the known static analysis tools have limited quality or functionality when it comes to testing these common types of software.

Accordingly, it may be desirable to provide methods and systems for the static analysis of software that can handle external references to other software. For example, it may be desirable to provide methods and systems that can perform static analysis on a whole operating system or an application program.

SUMMARY OF THE INVENTION

In accordance with one feature of the invention, a method for certifying a distribution is provided. The certification is based on static analysis of functional representations that include all information used to generate object code from source code. Each object file used at runtime has an archived functional representation. A set of source code files for a distribution is received and compiled into object code. Functional representations of the compilation of the source code are collected in an archive. For each executable making up the distribution the transitive closure of its dependencies at runtime is determined. The archived functional representations corresponding to executables identified in the transitive closure are retrieved. The distribution is then certified based on analyzing the functional representations of the compilation of the source code of all executables.

In accordance with another feature of the invention, a system for certifying a distribution is provided. An archive of functional representations of source code is maintained. The functional representation includes information required to generate object code corresponding to the source code. A compiler is configured to compile a set of source code for a distribution into object code and emit functional representations of the set of source code used to generate object code. A linker is configured to build the distribution by linking together the object code from the set of source code and determine transitive closure of dependencies of all executables that depend at runtime on the generated object code. A tester retrieves the archived functional representation corresponding to executables identified in the transitive closure by the linker, build an abstract representation of the entire distribution based on the functional representation of the set of source code and the retrieved functional representation, performs a set of tests on the abstract representation of the entire distribution, and provides a result based on the set of tests that indicate whether a distribution is certified.

In accordance with another feature of the invention, a compiler is configured to compile a source code file into an object code file. A front end receives the source code file and converts source code in the source code file into a functional representation. A back end converts the functional representation into an object code file. An emitter then emits the functional representation generated by the front end in the same file as the object code.

Additional features of the present invention will be set forth in part in the description which follows, and in part will be obvious from the description, or may be learned by practice of the invention. It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

Embodiments of the present invention provide systems and methods for the static analysis of entire systems of software. Source code for at least some of the software system is received. A functional representation for the source code is generated when the source code is compiled. The functional representation of the other software, which is referenced in the sources, is then retrieved from an archive and together they form an abstract representation of the entire software system. A static analysis is then performed against the abstract representation of the entire system and results are provided. The software system or one or more of its components may be certified based on the static analysis results.

Reference will now be made in detail to exemplary embodiments of the invention, which are illustrated in the accompanying drawings. Wherever possible, the same reference numbers will be used throughout the drawings to refer to the same or like parts.

Figure 1:
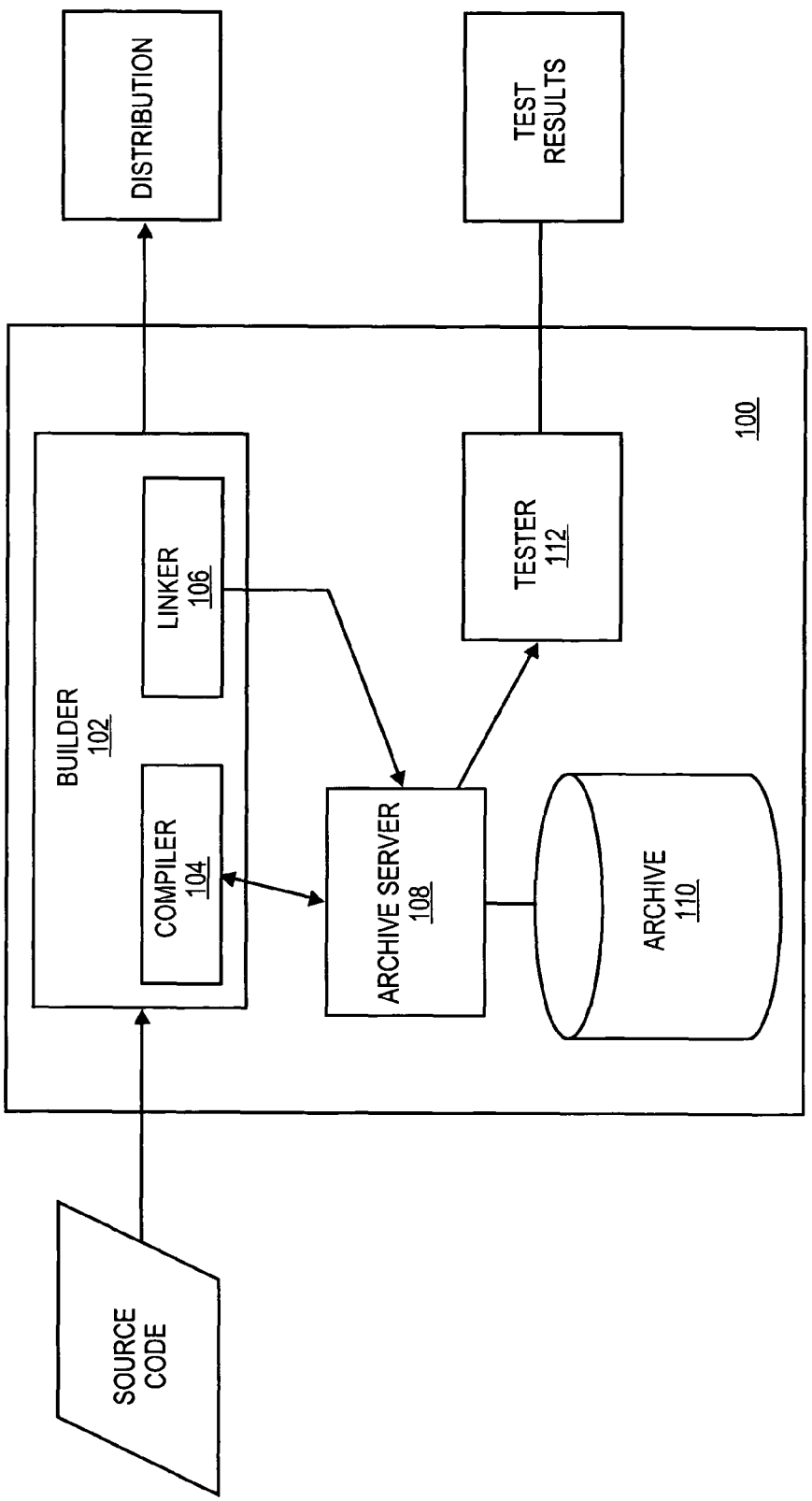
FIG. 1 illustrates an exemplary system that is in accordance with embodiments of the present invention.

FIG. 1 illustrates an exemplary system 100 that is in accordance with embodiments of the present invention. As shown, system 100 may comprise a builder 102 that includes a compiler 104 and a linker 106, an archive server 108, an archive database 110, and a tester 112. These components may be implemented using well known hardware and software. For example, these components may be implemented as applications running on one or more conventional servers. The functions of these exemplary components of system 100 will now be described.

Builder 102 assembles one or more executable programs into a system. In particular, builder 102 may be configured to receive one or more files of source code. Embodiments of the present invention may accommodate a variety of source code files that are written in general purpose programming languages, such as C, C++, and the like. Builder 102 may then convert the source code files into object code. Builder 102 may also import dependent objects, such as dynamic shared objects, from one or more library files that the object code utilizes. For example, builder 102 may be configured to build an operating system distribution, such as Linux distribution. Builder 102 may also build application programs and the like. Builder 102 may be implemented using one or more conventional servers or general purpose computers. As shown, builder 102 may comprise a compiler 104 and a linker 106 to perform the functions noted. Of course, one skilled in the art will recognize that builder 102 may include other components that assist in building executable programs.

Compiler 104 is a program running on builder 102 that translates the source code into object code. In general, compiler 104 may initially convert the source code into a generic data structure known as an intermediate representation. The functional representation may be in the form of a graph or tree data structure that contains all information to generate object code and perform code path analysis and optimization. The intermediate representation is then be converted into object code and a functional representation on the other hand. In some embodiments, compiler 104 may be configured to emit the functional representation of the source code in a related format into an archive. In addition, compiler 104 may include the functional representation as extensible markup language information in the files for the object code.

Compiler 104 may produce object code that is intended to run on the same type of computer and operating system as builder 102. Alternatively, compiler 104 may produce object code that is intended to run on a different computer or operating system. An exemplary architecture for compiler 104 is also shown and described with reference to FIG. 2.

Linker 106 is a program running on builder 102 that takes the object code generated by compiler 104 and assembles an executable program. Linker 106 may resolve references to symbol to other objects, such as objects from a library. In addition, linker 106 may also rearrange the object code in order to optimize its performance.

Archive server 108 is a device that is configured to collect the functional representations generated by compiler 104 for all source files and stores them to archive database 110. Alternatively the functional representation for all object files can be collected by linker 106 and stored in the executable program so that it, at a later time, can be extracted and possibly added to archive database 110. Archive server 108 may be implemented using well known database management system components to keep track of and maintain the functional representations.

Archive database 110 provides a storage infrastructure for storing the functional representations. Archive database 110 may be implemented using well known components. Thus, at any one time, the collection of functional representations stored in archive database 110 provides a comprehensive profile of an entire system of software, such as an operating system distribution.

Tester 112 is a system that builds an abstract representation of the executable program generated by builder 102 and performs static analysis on the abstract representation. Of note, tester 112 may build the abstract representation from the functional representations of the source code provided to builder 102 and may also retrieve the functional representations of objects that depend at runtime on the generated object code.

This feature of tester 112 allows it to fully trace code paths even when they extend beyond the boundary of the source code into an external object, such as a dynamically shared object. Many programs and operating systems permit the use of external references to an object, for example, based on dynamic linking. Dynamic linking is where an executable program does not resolve all of its symbols until runtime. The symbols point to an object that is typically contained in a library, such as a dynamic library.

Unlike conventional static analysis tools, tester 112 may account for dynamic linking and other external references in the source code by accessing archive database 110. This allows tester 112 to supplement the functional representation of the source code with the functional representation of objects that are referenced in the source code.

Figure 2:
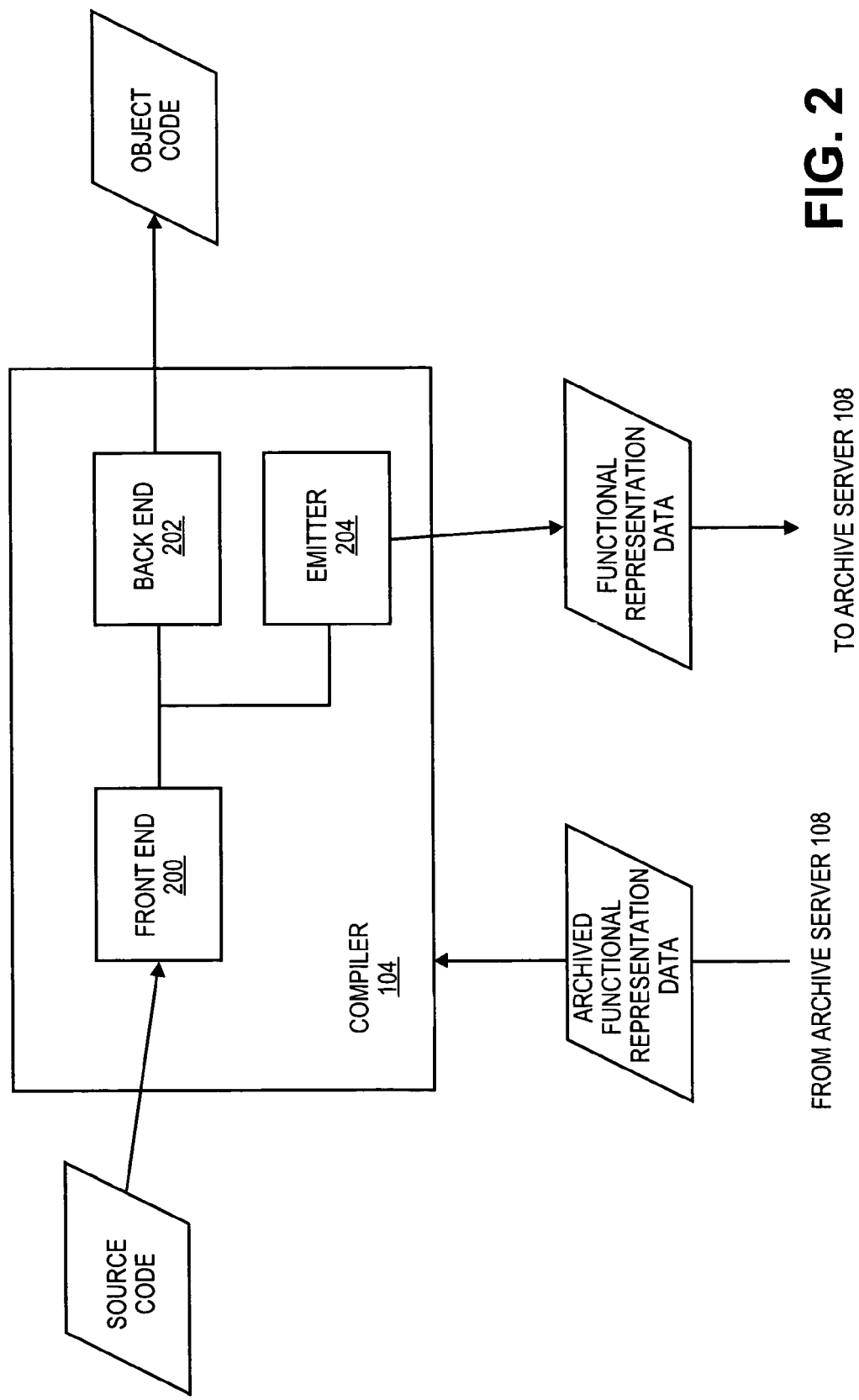
FIG. 2 illustrates an exemplary compiler that is in accordance with embodiments of the present invention.

FIG. 2 illustrates an exemplary architecture of compiler 104 that is in accordance with embodiments of the present invention. As shown, compiler 104 may further comprise a front end 200, a back end 202, and an emitter 204.

Front end 200 converts the source code into an functional representation. Front end 200 may perform the conversion in multiple stages comprising lexical analysis, syntax analysis, semantic analysis, and intermediate language generation. During lexical analysis, front end 200 Lexical breaks the source code text into what are generally known as "tokens." During syntax analysis, the syntactic structures of the source code are identified. In particular, front end 200 identifies the token of the programming language and determines the hierarchical structure of the source code. During semantic analysis, front end 200 checks the source code for errors and performs type checking. Front end 200 may then generate an intermediate representation of the source code. Front end 200 may then pass the intermediate representation to back end 202 and emitter 204. The intermediate representation may be a data structure, such as a tree or graph structure, that indicates the code paths of the source code.

Back end 202 converts the intermediate representation into object code that is executable by a computer system. Back end 202 may perform its conversion in multiple stages comprising compiler analysis, optimization, and object code generation. During compiler analysis, back end 202 gathers program information from the intermediate representation and determines attributes, such as define-use and use-define chains, data dependence, alias, defined or exported symbols, undefined or imported symbols, etc. Back end 202 may also build a call graph and control flow during this stage. During optimization, back end 202 attempts to make the intermediate representation more efficient. Typical optimizations by back end 202 may include inline expansion, dead code elimination, constant propagation, loop transformation, register allocation, and auto parallelization. Lastly, back end 202 will convert the intermediate representation into object code that is executable by machine. In many cases, back end 202 may create assembler code that is to be handled by the assembler before being usable by linker 106 and ultimately can be executed. When generating the object code, back end 202 may determine, among other things, which variables to fit into registers and memory and the selection and scheduling of appropriate instructions along with their addressing modes.

Emitter 204 also receives the intermediate representation from front end 200 and is configured to provide a functional representation. For example, emitter 204 may be configured to emit the functional representation in a format related to the intermediate representation to archive server 108 and to tester 112. In some embodiments, emitter 204 may format the functional representation in various formats, such as an extensible markup language ("XML") document. The structured nature of extensible markup language permits tester 112 to easily navigate through the functional representation. Of course, formats other than XML would also be supported by embodiments of the present invention. In addition, emitter 204 may include the functional representation as extensible markup language in the object code files output by the back end 202 in order to minimize any changes to the build process.

Figure 3:
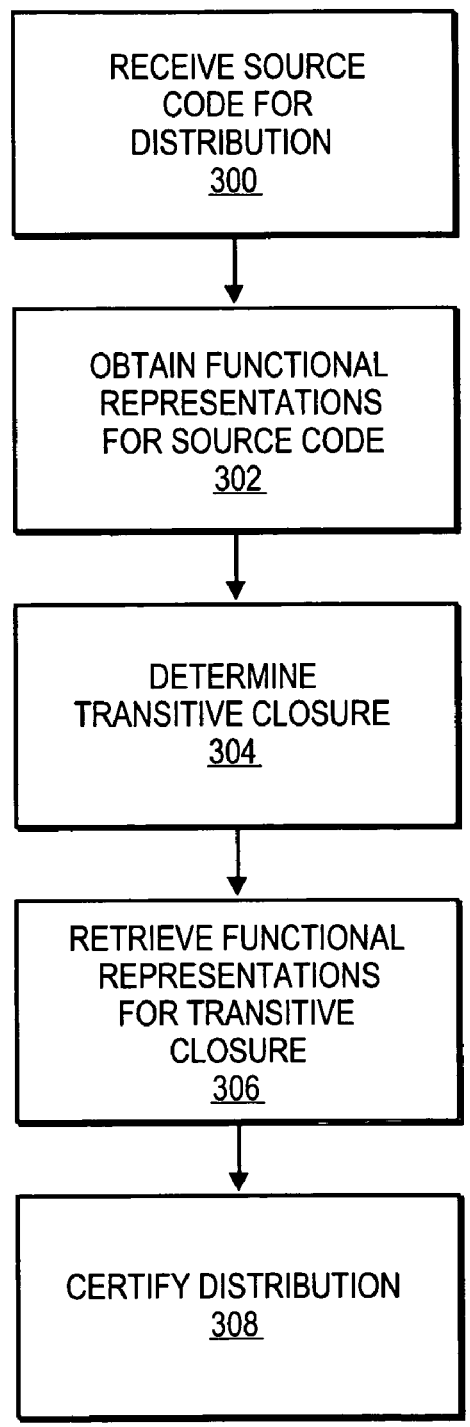
FIG. 3 illustrates an exemplary process flow that is in accordance with embodiments of the present invention.

FIG. 3 illustrates an exemplary process flow that is in accordance with embodiments of the present invention. For purposes of explanation, the process describes the static analysis and testing for an operating system distribution. However, one skilled in the art will recognize that embodiments of the present invention may apply to other programs and applications.

In stage 300, builder 102 receives source code for a distribution. For example, a user or software vendor may submit source code to builder 102 directly over a network, such as the Internet. Alternatively, builder 102 may receive the source code for a distribution indirectly, such as a compact disk that has been sent through the mail.

In stage 302, archive server 108 and tester 112 obtain functional representations of the source code. In particular, builder 102 may pass the source code to compiler 104. Compiler 104 converts the source code into the functional representation. Emitter 204 inside of compiler provides the functional representation to archive server 108 and tester 112. Archive server 110 indexes and stores the functional representation in archive database 110. Tester 112 meanwhile performs static analysis on the functional representation. Processing may then flow to stage 304.

In stage 304, tester 112 determines the transitive closure of dependencies of all executables that have to be tested and that depend at runtime on the external object code. In particular, tester 112 may receive dependency information from builder 102 and determines the objects used at runtime. For example, tester 112 may identify use of dynamically shared objects or other calls to a dynamic library.

In stage 306, tester 112 accesses archive 110 and retrieves functional representations corresponding to executables identified in the transitive closure. For example, tester 112 may retrieve the functional representation of a dynamically shared object from a shared library. Tester 112 may build an abstract representation of the distribution based on the functional representations of the source code as well as the functional representations of dependent objects.

Tester 112 then performs static analysis on the abstract representation. For example, tester 112 may perform static analysis to detect bugs, such as null pointer dereferences, memory leaks, use freed memory, uninitialized variables, and buffer overflows. Of note, since the abstract representation spans the entire distribution, tester 112 is allowed to test virtually all code paths.

In stage 308, tester 112 may indicate whether the distribution is certified based on its static analysis. For example, tester 112 may certify a distribution, if less than a threshold number of bugs were found. In addition, tester 112 may output the results of its analysis.

Other embodiments of the invention will be apparent to those skilled in the art from consideration of the specification and practice of the invention disclosed herein. For example, if a dynamic library or other shared object is modified, its functional representation may be entered into archive database 110. This update may then trigger a new set of testing by tester 112. However, one skilled in the art will recognize that it is intended that the specification and examples be considered as exemplary only, with a true scope and spirit of the invention being indicated by the following claims.

What is claimed is:

1. A method for certifying a distribution based on static analysis of functional representations, said method comprising:
    determining, by a linker, a transitive closure of dependencies of all executables that depend at run-time on an object code compiled from a set of source code for the distribution, on a server;
    retrieving, by a tester, archived functional representations corresponding to the executables identified by the transitive closure of dependencies; and
    certifying the distribution based on statically analyzing functional representations of the set of source code and the retrieved functional representations corresponding to the executables.

2. The method of claim 1, further comprising generating the functional representations of the set of source code during the same invocation of a compiler that generated the object code for the set of source code.

3. The method of claim 1, wherein the functional representations of the set of source code are in an extensible markup language file.

4. The method of claim 1, further comprising:
    storing the functional representations of the set of source code as markup language information in a file for the object code.

5. The method of claim 1, wherein determining the transitive closure of dependencies of all executables that depend at run-time on the object code comprises identifying a link to a library.

6. The method of claim 1, wherein determining the transitive closure of dependencies of all executables that depend at run-time on the object code comprises identifying a dynamically shared object.

7. A system for certifying a distribution, said system comprising:
    a processor;
    an archive database of functional representations of source code, wherein the functional representations include information required to generate object code corresponding to the source code;
    a linker configured to determine a transitive closure of dependencies of all executables that depend at run-time on the object code generated from the source code;
    a tester configured to perform operations comprising:
        retrieving archived functional representations corresponding to the executables identified in the transitive closure by the linker,
        building an abstract representation of the distribution based on the functional representations of source code and the retrieved archived functional representations corresponding to the executables,
        performing a set of static tests on the abstract representation of the distribution, and providing a result based on the set of static tests that indicates whether the distribution is certified.

8. The system of claim 7, wherein the archive database is configured to store extensible markup language files that include the functional representations of source code.

9. The system of claim 7, further comprising: a compiler configured to simultaneously compile the source code for the distribution into object code and emit the functional representations of the source code used to generate the object code.

10. The system of claim 9, wherein the compiler is configured to emit the functional representations as extensible markup language within a file containing the object code.

11. The system of claim 9, wherein the compiler comprises a front end that is configured to receive a C language source code file.

12. The system of claim 9, wherein the compiler comprises a front end that is configured to receive a general purpose language source code file.

13. The system of claim 9, wherein the compiler comprises an emitter that is configured to emit the functional representation simultaneously with a back end converting an intermediate representation into the object code.

14. The system of claim 13, wherein the emitter is configured to emit the functional representation as extensible markup language information in the object code.

15. The system of claim 7, wherein the linker is configured to determine objects in a library that depend at run-time on the generated object code.

\* \* \* \* \*